United States Patent [19]

Ota et al.

[11] Patent Number: 5,776,509
[45] Date of Patent: Jul. 7, 1998

[54] DIE ASSEMBLY DEVICE FOR MOLDING LAMINATED ASSEMBLIES

[75] Inventors: Tetsuyuki Ota; Masahiko Hara, both of Kanagawa-ken, Japan

[73] Assignee: Kasai Koyco Co., Ltd. Tokyo-to, Japan

[21] Appl. No.: 623,900

[22] Filed: Mar. 27, 1996

[30] Foreign Application Priority Data

Mar. 29, 1995 [JP] Japan .................................. 7-072015

[51] Int. Cl.⁶ .................................................. B29C 45/14
[52] U.S. Cl. ............................ 425/111; 249/83; 249/91; 264/275; 425/127; 425/129.1; 425/DIG. 60
[58] Field of Search .............................. 425/111, 116, 425/127, 129.1, 584, DIG. 60; 249/83, 91; 264/275

[56] References Cited

U.S. PATENT DOCUMENTS

| | | | |
|---|---|---|---|
| 4,201,612 | 5/1980 | Figge et al. | 264/275 |
| 4,260,576 | 4/1981 | Pollard | 425/127 |
| 4,266,925 | 5/1981 | Book | 425/DIG. 60 |

Primary Examiner—Tim Heitbrink
Attorney, Agent, or Firm—Dickstein Shapiro Morin & Oshinsky LLP

[57] ABSTRACT

In a method and die assembly device for molding a laminated assembly comprising a resin core member and a surface skin member covering a part of the surface of the resin core member, the shifting and creasing of the surface skin member is avoided, the molding precision is increased during the mold press forming process, and the external appearance of the assembly is improved. By providing an outer peripheral groove in the die surface of the upper die for mold press forming along the outer periphery of the cavity of the upper die, and relatively large vacuum suction holes in this outer peripheral groove while providing relatively small vacuum suction holes inside the cavity, in particular in recessed parts thereof corresponding to the corners of the product, the surface skin member can be retained to the upper die when mounting the surface skin member on the upper die in both secure and well sealed manner so that the surface skin member would not shift or crease during the mold press forming process, and, therefore, the molding precision can be improved.

7 Claims, 8 Drawing Sheets

DIE ASSEMBLY DEVICE FOR MOLDING LAMINATED ASSEMBLIES

TECHNICAL FIELD

The present invention relates to a method and a die assembly for molding laminated assemblies which are suitable for use as automotive upholstery components such as automotive door trims, and in particular to a method and a die assembly for molding two-element laminated assemblies, which consist of a resin core member and a surface skin member covering a part of the surface of the resin core member, so as to achieve a highly attractive external appearance while maintaining a favorable surface texture and cushioning property.

BACKGROUND OF THE INVENTION

FIG. 11 shows an automotive door trim given as an example of typical conventional automotive upholstery component. The automotive door trim 1 conventionally consisted of a two-element molded assembly having an upper potion 1a and a lower portion 1b having different appearances (including their colors) to enhance the attractive appearance. Normally, the upper portion 1a and the lower portions 1b were fabricated separately, and were joined by screws.

More recently, it has been proposed to use a common resin core member to provide a more economical two-element molded assembly. Such a molded assembly typically comprises a resin core member 2 molded into a curved shape, provided with a sufficient rigidity to retain its shape and to be mounted on a vehicle body panel, and a surface skin member 3 covering a part of the resin core member 2. With regard to the upper portion 1a, the surface of the resin core member 2 is covered by the surface skin member 3. With regard to the lower potion 1b, no surface skin member is used, and the resin core member 2 is exposed so that a contrasting appearance may be created in relation with the upper portion 1a.

The applicant of this application has previously filed a Japanese patent application No. 6-181500 on a method for molding a laminated assembly such as the automotive door trim 1 illustrated in FIG. 11. According to this previous proposal, as illustrated in FIG. 12, when the upper and lower dies 4 and 5 for mold press forming are open, the surface skin member 3 is placed on a part of the die surface of the upper die 5, and the upper die 5 is lowered by a prescribed stroke so that a prescribed gap is defined between the upper and lower dies 4 and 5. Then, semi-molten resin M is delivered from an injection molding device 6 connected to the lower die 4 to a prescribed area of the die surface of the lower die 4 via a gate 4a passed through the lower die 4. Thereafter, the upper die 5 is lowered to its bottom dead center to thereby close the upper and lower dies 4 and 5 upon each other so that the resin core member 2 is mold press formed into the prescribed shape while the surface skin member 3 is integrally attached to the corresponding part of the surface of the resin core member 2. The molding of the entire automotive door trim 1 can thus completed as a single process.

However, according to this conventional method, the surface skin member 3 is retained to a part of the die surface of the upper die 5 by vacuum suction, the force of this vacuum suction was conventionally not strong enough to entirely prevent the skin member 3 from shifting under the pressure of the semi-molten resin during the mold press forming process, or to prevent some of the semi-molten resin from leaking out to the surface of the surface skin member 3. In particular, the edge of the surface skin member 3 tends to create an unsightly view, and this is known to severely impair the appearance of the product.

Also, because any positive tension is not applied to the surface skin member during the process of mold press forming, the surface skin member 3 tends to be dragged by the die surface, and creases may be produced in the peripheral part of the product.

BRIEF SUMMARY OF THE INVENTION

In view of such problems of the prior art, a primary object of the present invention is to provide a method for molding laminated assemblies such as automotive door trims including a surface skin member and a resin core member which allows the surface skin member to be attached to a part of the surface member of the resin core member in an accurate manner without causing any undesirable appearances of the surface skin member.

A second object of the present invention is to provide a method for molding laminated assemblies including a surface skin member and a resin core member which allows the surface skin member to be securely and readily retained on an upper die of the die assembly for integrally mold press forming the assembly.

A third object of the present invention is to provide a die assembly device which is suitable for implementing the method of the present invention.

A fourth object of the present invention is to provide a die assembly device for molding laminated assemblies including a surface skin member and a resin core which can prevent any creases and any waviness from developing in the surface during the process of integrally mold press forming the assembly.

A fifth object of the present invention is to provide a die assembly device which can prevent the material from the resin core member from oozing out onto the surface of the surface skin member via the peripheral edge thereof.

A sixth object of the present invention is to provide a die assembly device which allows a laminated assembly to be molded in a favorable fashion even when the part of the resin core member covered by the surface skin member has a highly curved contour.

According to the present invention, these and other objects can be accomplished by providing a method for molding laminated assemblies essentially consisting of a resin core member and a surface skin member covering at least a part of the resin core member, comprising the steps of: molding a surface skin member to an approximate shape of a final shape thereof; preparing a die assembly for mold press forming including an upper die and a lower die which are adapted to be selectively closed upon each other; mounting the surface skin member on a part of a die surface of the upper die, the surface skin member being closely attached to the die surface of the upper die along a periphery of the surface skin member by vacuum suction means provided in an outer peripheral groove provided along an outer periphery of a cavity of the upper die; supplying semi-molten resin material into a cavity defined between the upper and lower dies; and finally closing the upper and lower dies so that the resin core member is mold press formed into a prescribed shape, and that the surface skin member is integrally attached to a part of a surface of the resin core member.

Because vacuum suction holes are provided in the peripheral groove extending along the outer periphery of the cavity, the surface skin member can be uniformly secured along the peripheral part thereof, and, hence, any waviness or creases are prevented from developing along the peripheral part of the surface skin member. Because the surface skin member is more securely retained to the die surface of the upper die than heretofore possible without creating any permanent marks on the surface skin member, the shifting of the surface skin member due to the pressure of the resin material during the mold press forming process can be avoided, and the resin material is prevented from showing on the surface of the surface skin member. Also, because the surface skin member is so securely attached to the upper die before the mold press forming process that adverse effects which may arise from the heat and pressure of the resin material can be avoided.

This method can be implemented in a favorable fashion by using a die assembly device, comprising: a die assembly for mold press forming, including an upper die and a lower die adapted to be closed upon each other; means for selectively closing the die assembly; an injection molding device for supplying at least semi-molten resin material serving as material for the resin core member over a die surface of the lower die; wherein the die assembly comprises a peripheral groove extending at least partly along a peripheral part of a cavity defined in a die surface of the upper die; a plurality of vacuum suction holes arranged in a bottom region of the groove; and vacuum suction means communicating with the vacuum suction holes for producing a negative pressure in the groove. The lateral edges defining the groove provides an additional force of engagement for retaining the surface skin member to the upper die, and this effect can be enhanced by defining the groove by a relatively sharp corner along each lateral edge thereof.

By providing set pins, for instance one between each adjacent pair of vacuum suction holes in the outer peripheral groove, it is possible not only to increase the force effective in retaining the surface skin member to the upper die but also to apply a pre-tension to the surface skin member when mounting the surface skin member on the upper die.

Preferably, the die assembly further comprises additional vacuum suction holes communicated with vacuum suction means inside the cavity of the upper die for producing a force for retaining a selected part of the surface skin member to the die surface of the upper die. A porous member embedded in the upper die may be used instead of the additional vacuum suction holes. Because the peripheral edge provides a favorable sealing effect, these additional vacuum suction holes and the porous member can produce a particularly strong retaining force. If desired, inner ends of at least part of the vacuum suction holes in the upper die may be countersunk so to adjust an effective length of each of the vacuum suction holes and to thereby control a vacuum suction force produced by each of the vacuum suction holes.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
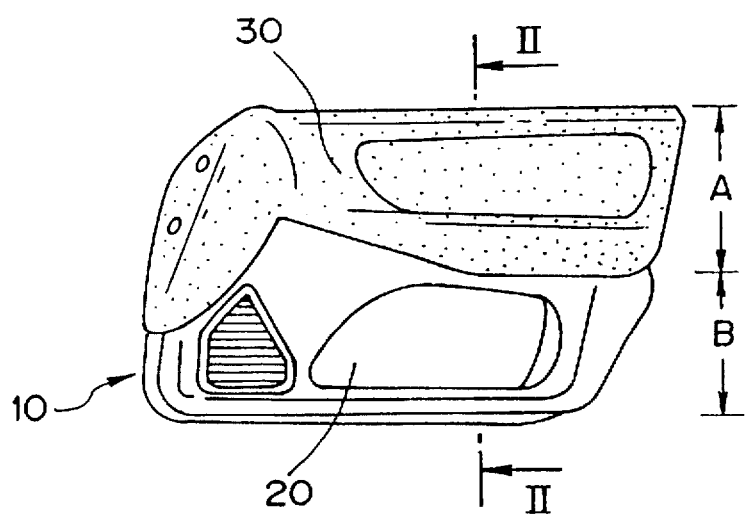
FIG. 1 is a front view of the automotive door trim which is fabricated the method of the present invention.
Figure 2:
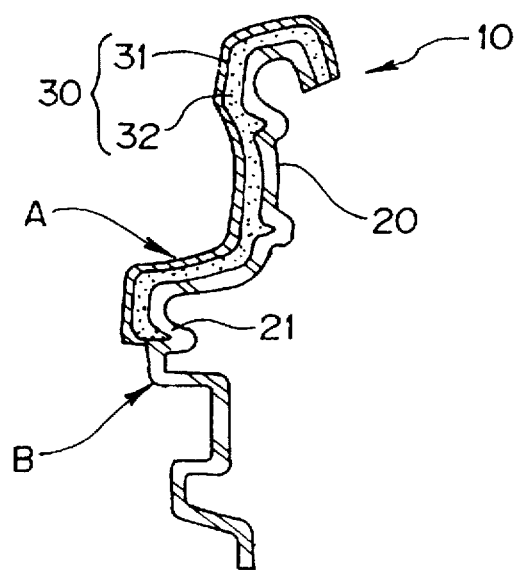
FIG. 2 is a sectional view taken along line II—II of FIG. 1.
Figure 3:
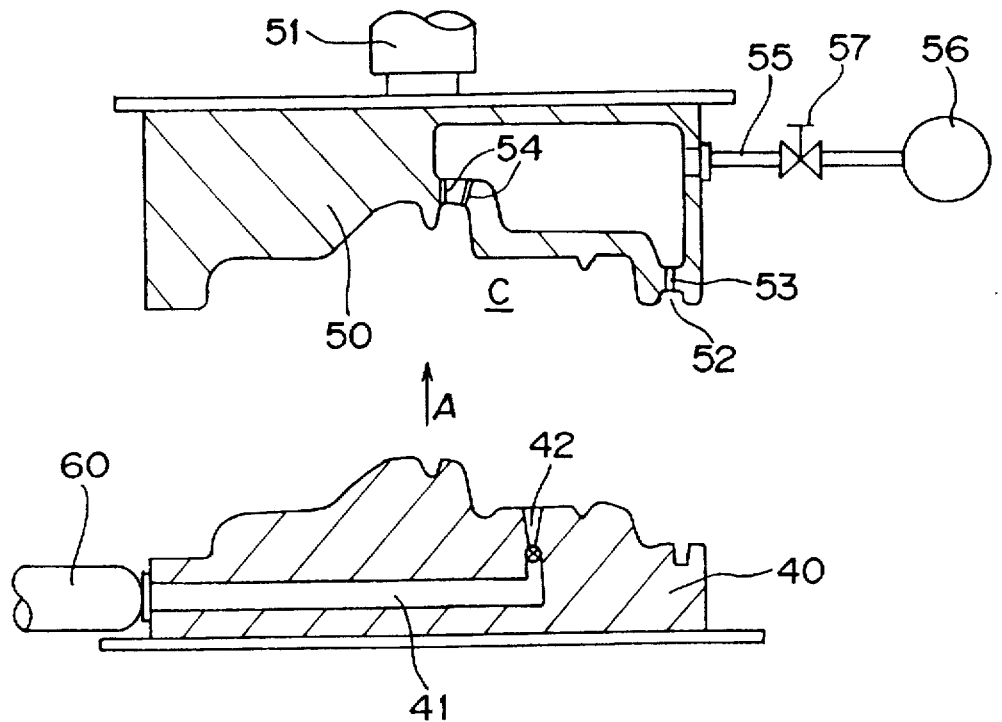
FIG. 3 is a sectional view showing a first embodiment of the die assembly device which can be used for implementing the method of the present invention.
Figure 4:
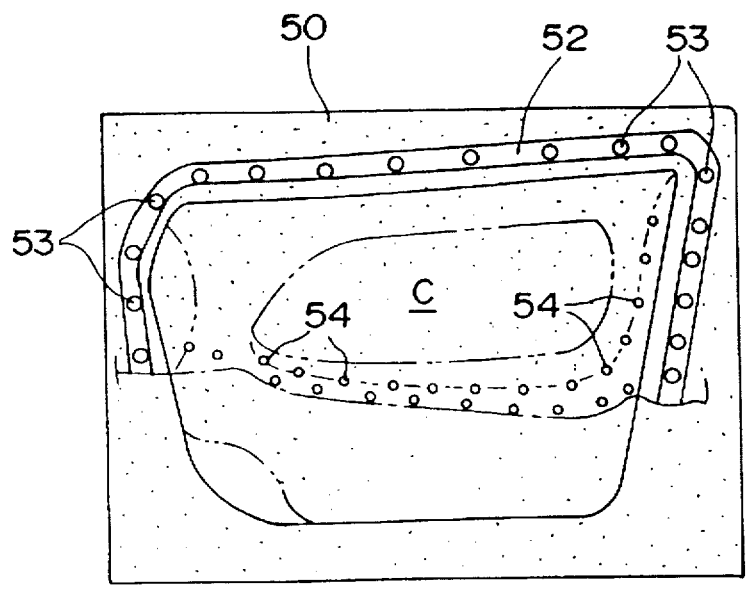
FIG. 4 is an end view as seen from the direction indicated by arrow A in FIG. 3.
Figure 5:
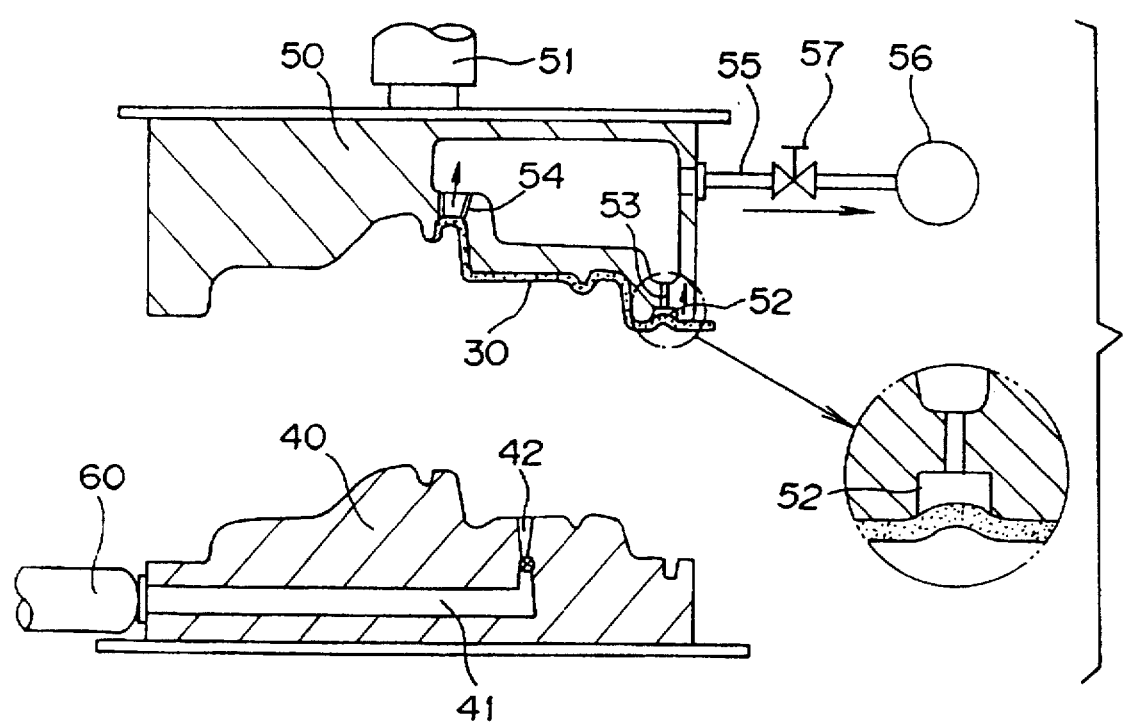
FIG. 5 is a sectional view showing the process of mounting the surface skin member in the method of the present invention.
Figure 6:
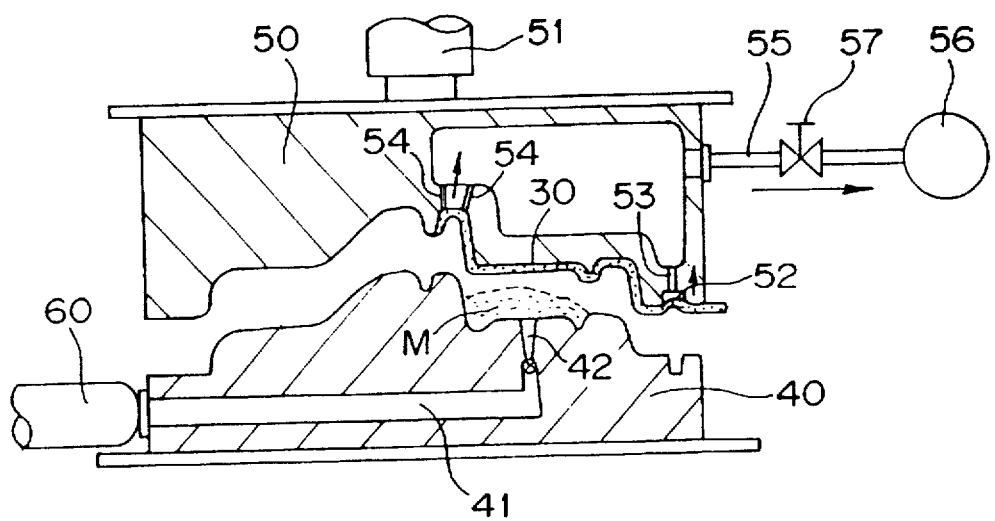
FIG. 6 is a sectional view showing the process of supplying the semimolten molten resin in the method of the present invention.
Figure 7:
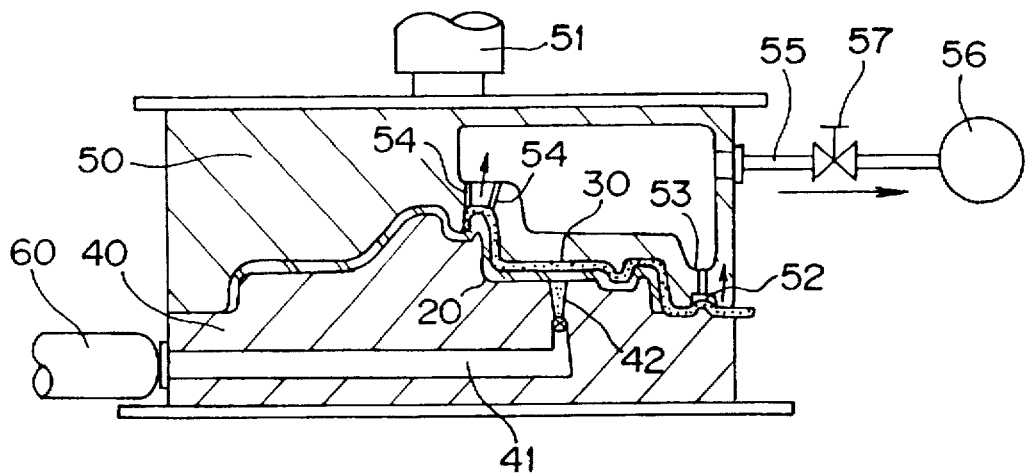
FIG. 7 is a sectional view showing the process of mold press forming in the method of the present invention.

FIG. 1 is a front view showing an automotive door trim fabricated by the method of the present invention, FIG. 2 is a sectional view showing the structure of the automotive door trim, FIG. 3 is a sectional view showing the overall structure of the molding die assembly used for implementing the method of the present invention, FIG. 4 is a view illustrating the vacuum suction holes arranged in the upper die of the die assembly device for mold press forming, and FIGS. 5 to 7 are sectional views showing different steps of the method of the present invention applied to the fabrication of the automotive door trim.

First of all, the structure of the automotive door trim 10 fabricated by the method of the present invention is briefly described in the following with reference to FIGS. 1 and 2. The automotive door trim 10 consists of a resin core member 20 molded into a desired curved shape, and a surface skin member 30 integrally attached to a part of the resin core member 20. The resin core member 20 is made of polypropylene resin mixed with a filler such as talc, and is molded into a complicated curved shape by the mold press forming process as described hereinafter. During this mold press forming process, the surface skin member 30 is integrally attached to a part of the surface of the resin core member 20.

The surface skin member 30 comprises a top layer 31 made of a PVC sheet, and a foamed lining layer 32 made of polyethylene foam. A groove 21 having a depth in the rage of 5 to 10 mm is formed in the resin core member 20 along the lower periphery of the surface skin member 30. By fitting the lower edge of the surface skin member 30 in this groove 21, the appearance of the surface skin member 30 along its periphery is improved.

The automotive door trim 10 which is made by the method of the present invention consists of an upper portion A in which the surface skin member 30 covers the resin core member 20, and a lower portion B in which the resin core member 20 is exposed so that contrasting appearances may be created between the upper and lower portions A and B. Therefore, as compared to the conventional door trim made by a two-element molded assembly, because the resin core member 20 is unitary or is integrally formed, the manufacturing steps can be simplified. In particular, the need for joining the lower member and the upper member together with screws or the like can be eliminated, and a substantial reduction in cost can be achieved.

The laminated assembly of the resin core member 20 and the surface skin member 30 provides a uniform cushioning property over the entire surface of the upper portion A, and is free from creases along its periphery. In particular, a favorable appearance is achieved along the boundary between the upper portion A and the lower portion B. Thus, a primary feature of the present invention is to allow an automotive door trim which has a favorable cushioning property and an attractive appearance to be produced in a simple manner.

Before describing the method of the present invention, the structure of the mold die assembly device for implementing the method of the present invention is described first with reference to FIGS. 3 and 4.

The molding die assembly used in the method of the present invention comprises a lower die 40 for mold press forming having a die surface of a desired configuration, an upper die 50 for mold press forming adapted to be moved vertically by a prescribed stroke, and an injection molding device 60 connected to the lower die 40 for supplying semi-molten resin material M serving as the material for the resin core member 20. More specifically, the lower die 40 for mold press forming is incorporated with a manifold 41 which is communicated with the nozzle of the injection molding device 60, and a plurality of gates 42 each communicating with this manifold 41 are provided in prescribed locations of the lower die 40.

The upper die 50 for mold press forming, which is located above the lower die 40, is adapted to move vertically by a prescribed stroke by a lifting cylinder 51, and is provided with a die surface which conforms to the surface contour of the automotive door trim 10 illustrated in FIGS. 1 and 2. The upper die 50 is additionally provided with special vacuum suction means for securely retaining the surface skin member 30 when it is mounted on the upper die 50. More specifically, a peripheral groove 52 is formed along the outer periphery of the cavity C of the upper die 50, and a plurality of relatively large vacuum suction holes 53 are formed in the bottom surface of the peripheral groove 52 at a prescribed pitch along the length of the groove 52.

The cavity C of the upper die 50 is also provided with a multitude of small vacuum suction holes 54 at locations where vacuum suction force is desired to be adapted to the shape of the product, such as the parts corresponding to recessed parts of the product, without leaving any marks on the product.

According to this embodiment, the width and depth of the peripheral groove 52 are 6 mm and 5 mm, respectively, and the diameter of each of the larger vacuum suction holes 53 is 6 mm while that of the smaller vacuum suction holes 54 is 0.3 mm. However, these figures are given only as an example, and are not intended to be restrictive of the scope of the present invention. The pitch of the vacuum suction holes 53 provided in the peripheral groove 52 is selected at 30 mm. The two sets of vacuum suction holes 53 and 54 are communicated with a vacuum suction conduit 55 which is in turn connected to a vacuum suction pump 56. The vacuum suction conduit 55 is provided with an on-off valve 57.

Now the process of fabricating the automotive door trim 10 illustrated in FIGS. 1 and 2 by using the above described die assembly device with reference to FIGS. 5 to 7 is briefly described.

FIG. 5 shows how the surface skin member 30 is mounted on a part of the die surface of the upper die 50. According to the method of the present invention, particularly in connection with the process of mounting the surface skin member 30, the peripheral groove 52 is provided in the die surface of the upper die 50 along the periphery of the cavity C, and the vacuum suction holes 53 having a relatively large diameter are arranged along the length of the peripheral groove 52. Additionally, the vacuum suction holes 53 of a smaller diameter are arranged more densely within the cavity C. As a result, the force for retaining the surface skin member 30 to the die surface of the upper die 50 is significantly increased, and the problems with the prior art are eliminated.

Figure 12:
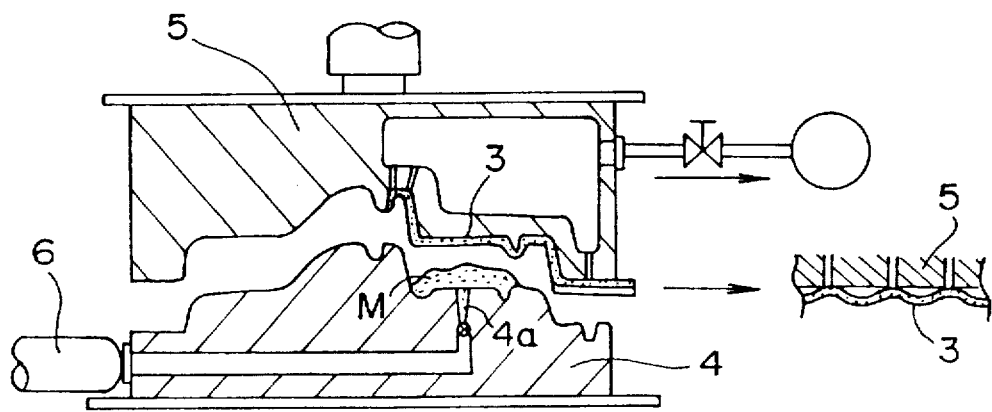
FIG. 12 is a sectional view showing the structure of the die assembly device which is used for molding the conventional automotive door trim.

More specifically, the surface skin member 30 is already provisionally molded to an approximate shape of the final product by a thermal molding process such as a vacuum molding process. When this surface skin member 30 is mounted on a part of the die surface of the upper die 50, the three sides of the surface skin member 30 (excluding the side defining a boundary line on the door trim) are securely retained by the vacuum suction force of the larger vacuum suction holes 53 provided in the outer peripheral groove 52, as illustrated in FIG. 5 in an enlarged scale. The surface skin member 30 is doubly sealed at the two corners of the outer peripheral groove 52 so that a highly effective sealing is accomplished along the peripheral part of the surface skin member 30. As a result, the vacuum suction force produced by the vacuum suction holes 54 provided within the cavity is increased, and the surface skin member 30 can be firmly secured to the desired part of the die surface of the upper die 50. Therefore, as opposed to the prior art, the creasing of the surface skin member as illustrated in FIG. 12, and the leaking of the resin material from a gap created between the surface skin member and the die surface is avoided.

Once the mounting of the surface skin member 30 is completed, the upper die 50 is lowered by a prescribed stroke by the action of the lifting cylinder 51 until a gap of approximately 50mm is defined between the upper and lower dies 40 and 50, and semi-molten resin material serving as the material for the resin core member 20 is distributed to the prescribed parts of the die surface of the lower die 40 from the injection molding device 60 via the hot runner 41 and the gates 42 as illustrated in FIG. 6. At this time, because the surface skin member 50 is closely attached to the die surface of the upper die 50, a sufficient clearance is defined in relation with the semi-molten resin M, and the surface skin member 50 is thereby protected from any adverse influences of the heat of the semi-molten resin M.

Thereafter, as illustrated in FIG. 7, the upper die 50 is lowered to its lower dead point, and the resin core member 20 is molded into the prescribed shape by closing of the upper and lower dies 40 and 50 while the surface skin member 30 is integrally attached to a part of the surface of the resin core member 20. At this time, the pressure of the semi-resin material M affects the surface skin member 30, but because the surface skin member 30 is firmly attached to the die surface of the upper die 50, the surface skin member 30 is prevented from shifting or creasing. Thus, the surface skin member 30 can be neatly attached to the resin core member 20, and the resin material would not leak out at the boundary of the surface skin member 30.

Figure 8:
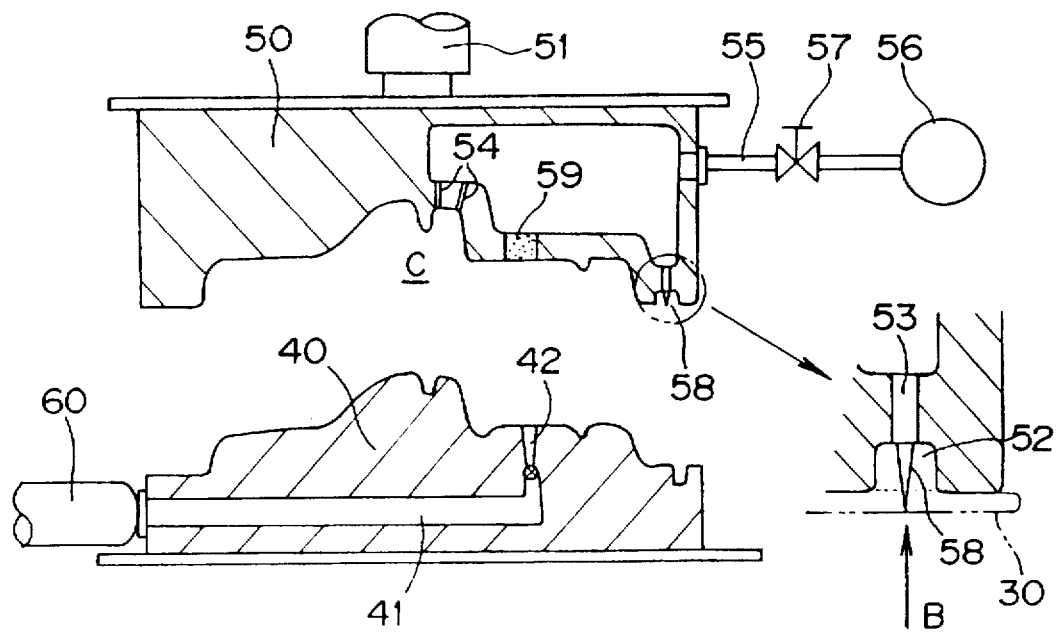
FIG. 8 is a sectional view showing a second embodiment of the die assembly device which can be used for implementing the method of the present invention.
Figure 9:
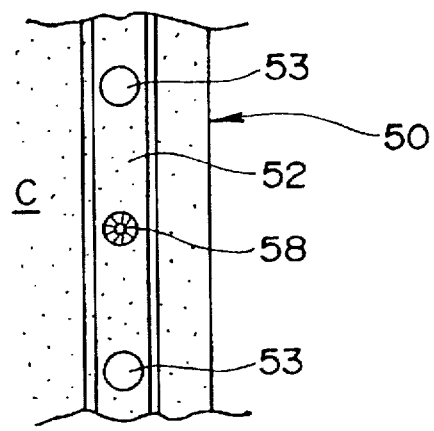
FIG. 9 is an end view as seen from the direction indicated by arrow B in FIG. 8.

FIGS. 8 and 9 show another embodiment of the die assembly device which can be used for implementing the method of the present invention. In this embodiment, in addition to a plurality of large vacuum suction holes 53 that are provided at a prescribed pitch in the outer peripheral groove 52 formed along the outer periphery of the cavity C of the upper die 50, set pins 58 are arranged between each adjacent pair of vacuum suction holes 53.

Thus, when the provisionally molded surface skin member 30 is mounted on a part of the die surface of the upper die 50, the surface skin member 30 is securely retained to the die surface by virtue of the large vacuum suction holes 53 provided in the outer peripheral groove 52 and the small vacuum suction holes 54 provided inside the cavity C. At this point, because of the provision of the set pins 58, the three sides of the surface skin member 30 are firmly secured by the set pins 58 so that the peripheral part of the surface skin member 30 is held taut by virtue of the tension which is applied to the surface skin member 30 during the process of mold press forming.

Therefore, the resin core member 20 and the surface skin member 30 are integrally joined together with a suitable tension applied to the surface skin member 30 so that the residual stress present in the surface skin member 30 prevents any creases from developing during the mold press forming process as opposed to the prior art. According to the present invention, it is possible to shape the product to have larger curvatures than heretofore possible, and the freedom of design with regard to the shape of the product can be improved.

The door trim 10 is often required to be provided with openings for fitting an inside handle unit, a pull handle unit and so forth, and such openings can be molded by placing fine porous members 59 on the upper die 50. By doing so, the force of vacuum suction to the surface skin member 30 can be increased.

Figure 10:
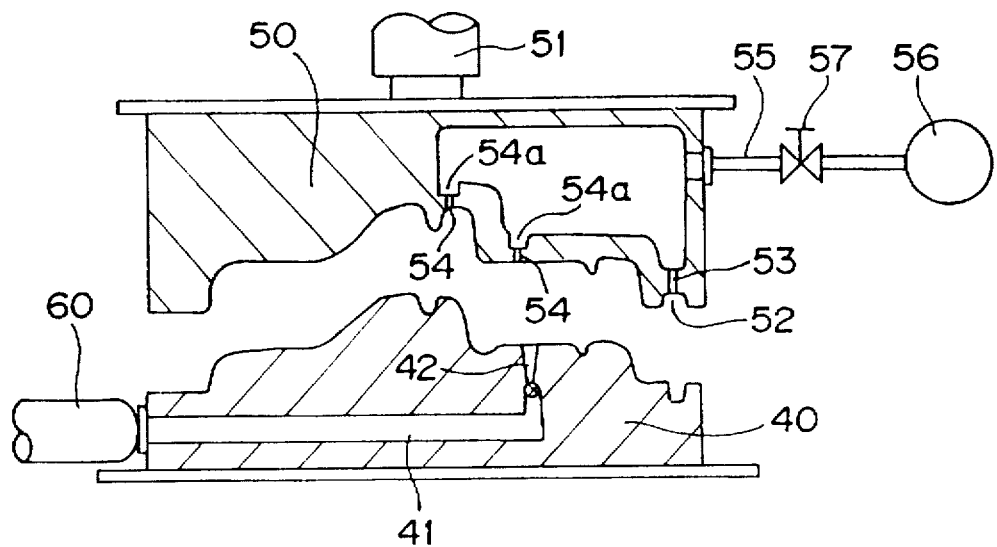
FIG. 10 is a sectional view showing a third embodiment of the die assembly device which can be used for implementing the method of the present invention.
Figure 11:
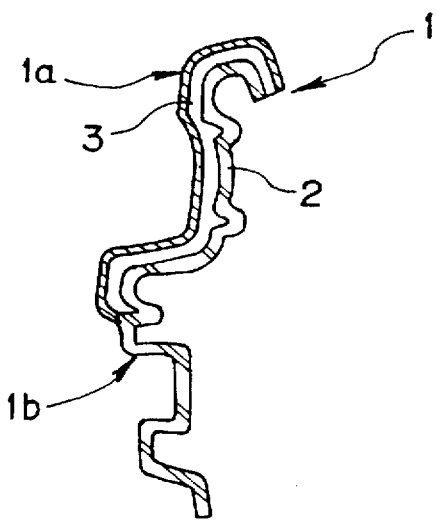
FIG. 11 is a sectional view of a conventional automotive door trim.

FIG. 10 shows yet another embodiment of the die assembly device which can be used for implementing the method of the present invention. In this embodiment, to reinforce the vacuum suction force produced by the vacuum suction holes 54 provided inside the cavity C of the upper die 50, the inner ends of the vacuum suction holes 54 in the upper die 50 are countersunk so that the length of each of the holes may be adjusted to 30 to 40 mm. The mode of countersinking the hole may be accomplished, for instance, by forming a cylindrical bore of a larger diameter than the vacuum suction hole, preferably in a substantially coaxial relationship. Alternatively, a conical recess may be formed at the inner end of the vacuum suction hole so that the inner end of the vacuum suction hole has a divergent flared shape. By countersinking the inner ends 54a of the vacuum suction holes 54, the length of each of the holes, and hence the resistance to the vacuum suction of each of the holes, can be reduced so that the vacuum suction force can be produced in an efficient manner.

According to the method of the present invention, the surface skin member 30 may be imprinted with the marks of the outer peripheral groove 52 and the large vacuum suction holes 53, but because the part of the surface skin member 30 carrying such marks are either trimmed or folded against the reverse surface of the resin core member 20, such marks will not be exposed, and would not impair the external appearance of the product.

The advantages of the present invention may be summarized as follows:

(1) By providing an outer peripheral groove along the outer periphery of the cavity of the upper die, and relatively large vacuum suction holes in this outer peripheral groove while providing relatively small vacuum suction holes inside the cavity, the surface skin member can be securely retained to the upper die when mounting the surface skin member on the upper die. Therefore, the surface skin member would not shift or crease when subjected to the pressure of the resin material during the mold press forming process, and, therefore, can be secured to a prescribed part of the resin core member at a high precision.

(2) By providing an outer peripheral groove along the outer periphery of the cavity of the upper die, and relatively large vacuum suction holes in this outer peripheral groove while providing relatively small vacuum suction holes inside the cavity, the surface skin member can be securely retained to the upper die when mounting the surface skin member on the upper die. Therefore, the resin material would not inadvertently leak out during the mold press forming process, and any waviness of the peripheral part of the surface skin member can be avoided so that a favorable external appearance can be ensured to the product.

(3) When set pins are provided in combination with the large vacuum suction holes in the outer peripheral groove provided along the outer periphery of the cavity of the upper die, sealing of the peripheral part of the surface skin member can be improved, and a suitable tension can be applied to the surface skin member by virtue of the molding pressure during the mold press forming process. In particular, the peripheral flange of the surface skin member can be folded over the resin core member without creasing, and the occurrence of defective products due to creasing can be substantially reduced. Also, because the product can be molded without producing any creases even when it involves a highly curved peripheral shape, the freedom of design regarding the shape of the product can be increased.

What we claim is:

1. A die assembly device for molding laminated assemblies essentially consisting of a resin core member and a surface skin member covering at least part of said resin core, comprising:

a die assembly for mold press forming, including an upper die and a lower die adapted to be closed upon each other;

means for selectively closing said die assembly; and an injection molding device for supplying at least semi-molten resin material serving as material for said resin core member over a die surface of said lower die;

wherein said die assembly comprises a peripheral groove extending at least partly along a peripheral part of a cavity defined in a die surface of said upper die; a plurality of vacuum suction holes arranged in a bottom region of said groove; and vacuum suction means communicating with said vacuum suction holes for producing a negative pressure in said groove.

2. A die assembly device according to claim 1, wherein said die assembly further comprises additional vacuum suction holes communicated with vacuum suction means inside said cavity of said upper die for producing a force for retaining a selected part of said surface skin member to said die surface of said upper die.

3. A die assembly device according to claim 1, wherein said die assembly further comprises a porous member embedded in said die surface of said upper die, said porous member being communicated with vacuum suction means inside said cavity of said upper die for producing a force for retaining a selected part of said surface skin member to said die surface of said upper die.

4. A die assembly device according to claim 1, wherein said groove is defined by a relatively sharp corner along each lateral edge thereof.

5. A die assembly device according to claim 1, wherein said die assembly further comprising pointed set pins arranged inside said groove.

6. A die assembly device according to claim 5, wherein said set pins are arranged along a length of said groove so as to alternate with said vacuum suction holes provided in said groove.

7. A die assembly device according to claim 1, wherein inner ends of at least part of said vacuum suction holes in said upper die are countersunk to adjust an effective length of each of said vacuum suction holes and to thereby control a vacuum suction force produced by each of said vacuum suction holes.

* * * * *